United States Patent [19]
Roeder

[11] 3,901,470
[45] Aug. 26, 1975

[54] FLOOR SUPPORT MOUNT

[76] Inventor: Richard C. Roeder, 1718 Lublock, Houston, Tex. 77007

[22] Filed: June 12, 1973

[21] Appl. No.: 369,413

[52] U.S. Cl. .............. 248/188.4; 52/704; 248/161; 248/188.5
[51] Int. Cl.² ........................................ F16M 11/14
[58] Field of Search .......... 248/188.4, 188.2, 188.5, 248/158, 159, 157, 161, 243, 23; 52/273, 704, 161; 85/67, 69, 68

[56] References Cited
UNITED STATES PATENTS

| | | | |
|---|---|---|---|
| 1,213,228 | 1/1917 | Matsinger | 85/69 |
| 1,355,429 | 10/1920 | Sabins | 248/188.4 |
| 1,734,215 | 11/1929 | Kinard | 248/23 |
| 1,832,938 | 11/1931 | Leach | 248/23 |
| 1,899,835 | 2/1933 | Thum | 248/188.2 |
| 2,210,441 | 8/1940 | Bachman | 52/704 |
| 2,371,460 | 3/1945 | Needham | 248/188.2 |
| 3,080,980 | 3/1963 | Gibbons | 248/243 |
| 3,100,099 | 8/1963 | Schaefer | 248/188.4 |
| 3,420,013 | 1/1969 | Alvarado | 52/704 |
| 3,424,413 | 1/1969 | Applegate | 248/188.4 |

FOREIGN PATENTS OR APPLICATIONS

| | | | |
|---|---|---|---|
| 689,321 | 6/1964 | Canada | 52/161 |

Primary Examiner—Marion Parsons, Jr.
Attorney, Agent, or Firm—Kenneth H. Johnson

[57] ABSTRACT

A floor support mount which is rigidly affixed to a floor and which comprises a base plate, a stanchion, leveling and positioning screws on the base plate and an anchor bolt seated in the stanchion and serving as the only securing means to the floor.

The particular advantage of the present mount is the minimum of labor required to facilitate the stationing of the mount, the simplicity of stationing the mount once the basic preparation is made, and the suitability of the mount for use in carpeted areas without removal of or damage to the carpet.

14 Claims, 3 Drawing Figures

PATENTED AUG 26 1975 3,901,470

FLOOR SUPPORT MOUNT

BACKGROUND OF THE INVENTION

The present invention relates to a floor mounted support. More particularly it relates to a floor mounted support which requires a very minimum of labor to install. The invention in particular relates to floor mounted supports for use in carpeted areas.

This invention is the result of an intensive effort to develop new concepts and methods relating to interior construction and design, which will provide greater flexibility and cost economy than any presently available methods can provide. The particular area where the present invention is finding immediate and current application is in retail stores, although the present invention is just as applicable for other environments, such as homes, offices and factories.

One of the premises of this new concept was that nonstructural interior stanchions would be free standing in regard to the ceiling, that is, the sole upright support for the stanchion would be its mount on the floor. Thus, the floor mount must be of a substantial character and with a relative degree of permanence. In order to achieve the requisite stability in the stanchion, it would be expected that craftsmen representing one or more trades might well be involved and substantial amounts of time, detailed work orders, etc., would be required.

In any operation where it is frequently desirable to move or relocate walls, partitions, post and the like, it must be appreciated that rather costly labor services be eliminated or reduced to a minimum. This is particularly true in the case of retail stores. It is quite often necessary or at least desirable from a merchandising or display point of view to remove, move or rearrange the location of the various partitions and display racks within the store or a particular area of the store. This facilitates rearranging flow and display within a department or can be used to increase or decrease the size of a department or to create new areas in keeping with trends in fashions and tastes.

Previously it has required a substantial effort, employing various skills to achieve any permanent arrangement or rearrangement of walls, partitions, racks and the like. The construction methods of the prior art normally took several days or weeks and caused severe disruption, even when carried out during night time and weekends. The use of overtime labor, of course, greatly added to the cost. Very frequently removal of a wall or partition would leave a carpet discontinuity which required recarpeting to maintain the appropriate appearance. Similarly the construction of new walls, partitions and racks with prior methods usually means permanent damage to the carpeting or more likely these items are in place prior to carpeting.

An alternative to permanent construction is temporary construction which is widely used. In any situation, temporary walls are not preferred because of the impermanence. In a retail store a partition or wall which is not secured in place can present a very serious risk of inadvertent displacement or even toppling. Racks that are not permanently in place can usually be expected to be displaced out of alignment and create a disarrayed appearance, not conducive to an attractive display area.

Because of the heavy customer traffic in a retail store, safe, stable fixtures, walls, partitions, etc., are essential. As noted above, temporary, easily displacable walls, partitions, racks and the like are not safe, since it cannot be expected that customers, and especially children will be aware of the flimsy and unstable nature of these items.

SUMMARY OF THE INVENTION

The present invention relates to a floor support mount and the method of construction employing said mount. Very briefly stated, the floor support mount comprises a base plate, a stanchion rigidly connected to said base plate and means located at the base of said stanchions and accessable through said stanchion for attaching said stanchion to a surface.

The stanchion is preferably a tube like member which has a plate at the lower end adjacent to where the base plate is attached. The internal plate has a hole adapted to allow a bolt to pass through. The bolt is seated into an anchor in the floor and tightened to form a permanent, yet displacable support.

A particular feature of the present invention is a means for leveling the base plate and hence the stanchion. It has been found that leveling can be achieved very effectively with a plurality of leveling screws mounted in the base plate and adapted to engage the floor while mounted in the base plate. A further refinement of the leveling means requires a metal plate seated on the floor at locations corresponding to the leveling screws in the base plate. This metal plate provides a generally harder surface than the usual floor materials and allows the leveling screws to be drawn down very tightly against the floor. The leveling screws both level and provide a counter force against the anchor bolt.

The stanchion is usually attached to the base plate, normal thereto, although some angular inclinations from the normal may be anticipated and contemplated within the scope of of the invention. Thus, preferably the stanchion is substantially perpendicular to the base plate. The stanchion is also preferably a relatively short member, that is, the stanchion would preferably be from 6 inches to 2 to 3 feet in length. It could be longer or shorter, but certain problems are added outside of this general range. The preferred length allows very convenient access to the bolt head, using a socket wrench with a tee extension of approximate length, for example. The problem with extremely long stanchions is, of course, the need for longer extensions on the wrench socket. This could interfere with the benefits to be described, in regard to the invention, i.e., easy installation.

A stanchion which is too short may be detrimental to an aspect of the present invention to be described hereinafter. In this aspect or feature of the invention a second stanchion or upright member is fitted over the stanchion mounted on the base plate and removably attached thereto. This second upright member can reach to the ceiling and can serve as the member to which the wall, panel, racks, shelves or the like are attached. In an area of public use this upright member can be decorated, for example by painting, plating, anodizing or otherwise coating it for inhancing its appearance, whereas the stanchion can and usually will be undecorated, although it may be coated or painted for protective purposes.

The rigidity and strength of the outer upright member is attributable directly to the stanchion to which it is attached and a sufficient length of stanchion should be provided for transferring these force effects to the upright member. The lengthier stanchion is also preferred for a feature of adjustability which it has been found necessary to provide. The outer upright member will usually be secured to the stanchion by means of one or more bolts. Very often there will be features on two or more outer upright members which must align on a horizontal plane, for example shelf notches in the outer members. It is an unfortunate fact that in the case of poured concrete floors, a common construction technique, the floor can vary by as much as 4 to 6 inches over a relatively small area, say a 64 square foot area. Two or so inches variation is an expected norm. To correct for this variation in floor heights, the bolt holes in the stanchion may be slotted for 2 to 6 inch adjustment for compensation.

Another particular feature of the present invention is its nondestructive installation in carpeted areas. The carpeting is cut in order to peel it back from the work area of the floor where a hole is drilled for the floor anchor, however, the carpeting is not removed and is put back into its original position with provision being made for the bolt from the stanchion to seat in the anchor in the floor and for the leveling screws to contact the floor. The leveling screws also serve as a positioning means and serve to hold the base plate at the surface of the carpet pile without crushing it. When the floor support mount is removed. The cut or slit in the carpet is easily heat seamed and no indication of the mount ever having been present remains. The anchor hole may be filled, but that is not necessary because of its small size, i.e., ½ to 1½ inches diameter and the carpet and carpet padding over it.

It is an advantage of the invention that a rigid floor support mount is provided, which requires a minimum of labor for installation. It is a further feature of this invention that installation of the floor support mount causes a minimum amount of damage to the floor and any covering thereon. Another feature of the present invention is the placement of the means of attaching the mount to the floor, within the mount. yet, another feature of the present invention is the provision of an outer upright member, which is slidably and removably mounted on the upright stanchion of the floor mount. A particular feature of the present invention is the adjustable leveling and positioning means incorporated in the base plate of the mount. Another feature of the present invention is the adjustable positioning of the outer upright member on the stanchion. A particular advantage of the present invention is the provision of a permanent, removable floor support mount which can be mounted on carpet without permanent or irreparable damage to said carpet.

These advantages and features of the present invention, as well as others, will become apparent from the following detailed description of the invention, the drawings and the invention in relation thereto.

Like characters of reference indicate corresponding parts in the figures of the drawings. The present invention will be better understood by reference to the drawings and the detailed description thereof.

DRAWINGS

DETAILED DESCRIPTION OF PREFERRED EMBODIMENTS

Figure 1:
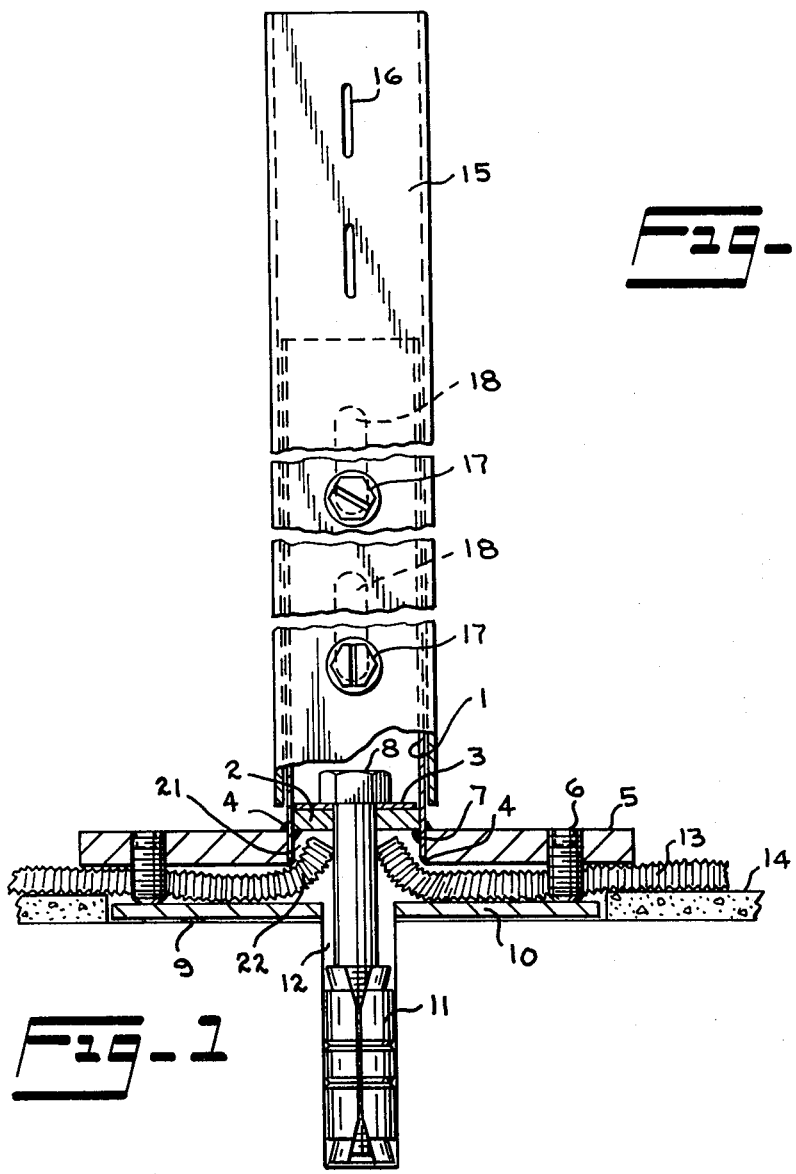
FIG. 1 is an elevation of one embodiment of the present floor support mount in partial cross section, as mounted on a floor or other surface.

Referring to FIG. 1 a floor support mount according to the present invention is seen in a mounted or installed position. A stanchion or inner upright member 1 is rigidly connected by welds 4 to base plate 5 in an opening 21 in approximately the center of base plate 5. The opening 21 is of such a size to tightly accommodate the outside diameter of stanchion 1. The welds 4 may be spotted or may extend around the periphery of the joint. The base plate 5 and stanchion 1 are preferably made of metal, principally steel, because ot its strength, workability and cost. Other materials could be employed such as high impact polyvinyl chloride or combination of materials, in which case, the welds could be cements, such as epoxy resins. The stanchion 1 is in effect a hollow tube.

Seated inside of stanchion 1 and rigidly attached thereto by welds 7 is an inner plate 2. Plate 2 is offset upward from the level of base plate 1 and in so doing a small compartment or area is created within the stanchion adjacent to the cut ends 22 of the carpet 13. As stated above, the present floor support mount is particularly adapted for installation over or in conjunction with carpeting.

The small compartment formed by the offset elevation of inner plate 3 provides the ends 22 of carpet 13 a place to repose while the mount is in place. The ends 22 represent that portion of carpet 13 which would lay over the hole 12. By this expedient the carpet 13 is preserved so that it can be reclosed over the hole 12 when the mount is removed.

Figure 2:
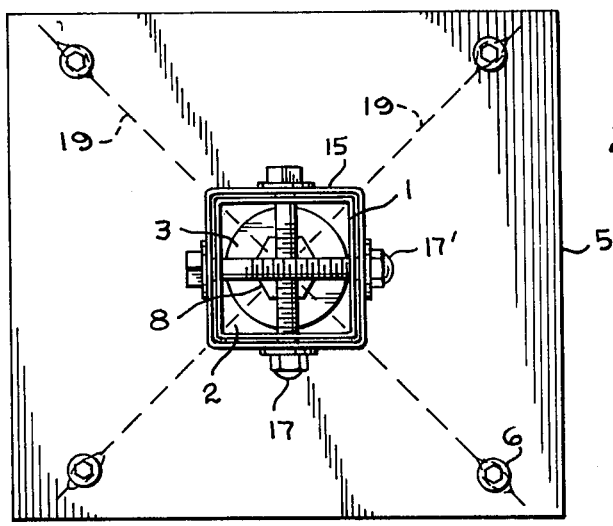
FIG. 2 is a top view of the present floor support mount as shown in FIG. 1.

The inner plate 2 has an opening therethrough, through which anchor bolt 8 is passed. The bolt 12 is seated into a double machine anchor 11 which has been seated into hole 12 in floor 9. As is usual, the anchor 11 is lead or other soft material into which machine bolt 8 cuts its way and at the same time expands the anchor against the sides of hole 12. The bolt 8 is tightened down into the anchor 11 by a socket wrench with a tee extension (not shown) to a point short of being rigidly tightened against the floor 9. The socket set screws 6 are now used to level base plate 5 and stanchion 1, using a plumb line or other leveling device. Referring to FIG. 2 it can be seen that there are four socket set screws 6, located toward the corners the base plate 5 which in this embodiment is rectangular. The base plate 5 could have other configurations, i.e., it could be round, square, hexagonal, octagonal, triangular or the like, with sufficient leveling screws 6 to level the base plate 5.

In. FIG. 2 the relationship of the carpet 13 and the leveling screws 6 is shown by the phantom lines 19. In order to avoid irreparable damage to the carpet, it is slit or cut along lines 19 to a point beyond the location of leveling screws 6. To avoid damage to the carpet, it is spread open along the cut at the point where the leveling screw will contact the floor.

Referring back to FIG. 1, the placement of the leveling screws 6 in position can be seen. The carpet padding 14 has been removed since replacement padding will not show in any event. The screws 6 can be contacted directly to the floor 9, however, it has been found that most flooring material such as wood, concrete, asphalt, etc., are too soft to withstand the pressure exerted as the mount is tightened. Thus, a plate 10 is provided, for example, a ¼ inch plate steel plate, with greater strength than the floor surface.

It should be noted that the leveling screws 6 also serve to position the mount and particularly the base plate 5, such that it does not bear on the carpet 13 and crush the pile or possibly abrade the pile and carpet mat (not specifically illustrated).

After base plate 5 has been leveled and positioned, it is desirable not to further adjust the screws 6. In order to tighten the mount and achieve a firm, secure positioning of the mount, the bolt 8 is now tightened down against washer 3. The leverage obtained with tee extension socket wrench by hand, has been found quite adequate for securing the mount to the floor.

The base plate 5 in this embodiment was a ½ inch polished chrome plated steel plate welded to 2 inch telspar polished chrome tubing 1. The inner upright member 1 was chromed so that if any portion showed, it would have an attractive appearance. The socket set screws 6 were similarly polished for appearance.

Figure 3:
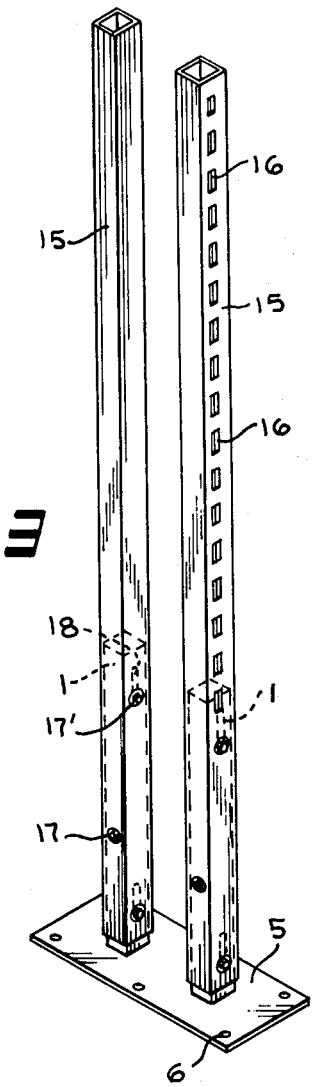
FIG. 3 is an isometric view of an embodiment of the present invention employing multiple stanchions.

The stanchion 1 was about 2 feet long. In order to obtain the desired height for the upright member, an outer upright member or tube 15 is put in place over the stanchion 1. The tube 15 is slidably mounted on stanchion 1 and secured in place by bolts 17 and 17' placed through aligned holes in both the inner 1 and outer 15 upright members. The hole 18 in stanchion 1 is preferably a slot, which allows the outer member 15 to be slid up or down to the desired position and then secured in place by tightening the nuts 23 or bolts 17 and 17'. In this embodiment the slots 18 were 3 inches long. Bolt 17' does not show in FIG. 1, since it was on an omitted section, however, bolt 17' is seen in FIGS. 2 and 3 and is inserted at a different angle than bolts 17. A series of slots 16 are shown on tube 15 of FIG. 1. The slots 16 are representative of the means for attachment of shelves, racks or wall members to tubing 16.

The floor mount support can be used by itself to support a circular rack or hanger or more preferably it will be employed in combination with other supports to form walls, partitions and shelves.

FIG. 3 shows a slightly modified embodiment of the present invention, in which two stanchions are on one base plate 2. The mount is otherwise the same as previously described for a single stanchion mount. The mount shown in FIG. 3 will have a securing means, e.g., an anchor bolt in both stanchions 1, which are secured to the anchors 11 in the floor. The leveling and positioning screws 6 operate as previously described. It can be appreciated that there can be more than two stanchions on a base plate in accordance with this invention. The slots 16 serve for attaching walls, racks, shelves, etc., to the tubes 15. Generally, opposed to slots 16 will be a second corresponding set of slots from 2 to 10 feet distant depending on the weight of the supported device or goods.

Referring again to FIG. 2, the top view of a single tube arrangement shows that bolts 17 and 17' are seated at approximately right angles. It, of course, should be appreciated that stanchion 1 and tube 15 can have other cross sections than that shown in the figures. For example, round tubing is a most likely alternative. Other suitable shapes would include, hexagonal, octagonal and triangular. It should be apparent also that in some applications tube 15 may be omitted or replaced with a counter top (not shown) for example.

To more fully appreciate the present invention, the method of employing it will be described. To remove the mount shown in FIG. 1, the bolts 17 and 17' are removed from stanchion 1. The bolt 8 is loosened until the mount can be lifted out of the position shown in FIG. 1. The plate 10 is removed and hole 12 can be left as is or filled with an appropriate material. A piece of padding is cut to size and placed in the place vacated by plate 10. The carpeting 13 is merely pressed into place and heat sealed along the slits 19. Since this is a usual technique used in splicing carpet, the previous slits 19 will not be visible. The carpet will show no undue wear since the base plate 5 was positioned just above it.

To position the mount as shown in FIG. 1 at a desired location, a center point at which the bolt 8 is to be positioned is selected. The carpet 13 is slit as indicated in FIG. 2 to the requisite length and a portion of padding 14, corresponding to plate 10 is removed and plate 10 inserted next to the floor. The slits 19 in the carpet allow it to be folded back out of the way during this portion of the installation. A hole 12 is bored or drilled in the floor 9 and a machine bolt anchor 11 inserted. The carpet 13 is returned to a flat configuration over plate 10 and floor support mount, with bolt 8 projecting, is seated such that the bolt is aligned with hole 12. The carpet ends 22 are pressed upward by hand from one side, similarly the socket set screws 6 are worked through the slits 19 in the carpet until they are founded on the plate 10. A socket wrench with an extension (not shown) is used to set the bolt 8 into anchor 11 and to draw the mount down a bit. The mount is then leveled and positioned just above the carpet using the socket set screws 11. The bolt 8 is then tightened. An outer upright member 15 is slid in place over the stanchion 1 and secured at the desired height by bolts 17 and 17' through corresponding holes in the two upright members.

The only aspects of real labor involved here are the slicing of the carpet and pad and the drilling of the hole and insertion of the anchor. Otherwise, the mount of the present invention is quite easily put in place by the so called "white collar" employees, for instance the manager of a department.

It, of course, is recognized that there are some obvious modifications, or mechanical adaptions of the present invention, which are not specifically recited herein and such are contemplated as being within the scope of this invention.

The invention claimed is:

1. A floor support mount adapted to be rigidly and removably secured to a surface comprising
   a base plate having means for leveling and positioning said base plate,
   a first hollow upright member rigidly attached to said base plate and perpendicular thereto,
   an opening in said base plate communicating with said hollow member,
   an second plate having an opening therein, rigidly attached at the lower end of said first hollow upright member and adjacent to said base plate, and a fastening mean accessable through said hollow upright member passing through said second plate and adapted to seat in an anchor in said surface.

2. The floor support mount according to claim 1 wherein said leveling means comprises a plurality of screws set in said base plate.

3. The floor support mount according to claim 2 wherein said fastening means comprises an anchor bolt movably positioned through said second plate.

4. The floor support mount according to claim 3 comprising a second hollow upright member slidably and removably, rigidly mounted on said first hollow upright member.

5. The floor support mount according to claim 1 having at least two first hollow upright members rigidly attached to said base plate.

6. A floor support mount adapted to be rigidly and removably secured to a carpeted surface without permanent damage to the carpet comprising A base plate having means for leveling and positioning said base plate, a first tube rigidly affixed to said base plate and substantially perpendicular thereto, an opening in said base plate communicating with said first tube, an inner plate having an opening therein rigidly affixed in said first tube and offset above and adjacent to said base plate, and a fastening means passing through said inner plate and adapted to seat in an anchor in the surface.

7. The floor support mount according to claim 6 wherein said leveling and positioning means comprises a plurality of screws, rotatably mounted in said base plate and adapted to contact the surface.

8. The floor support mount according to claim 7 wherein said inner plate forms a compartment within the lower portion of said first tube for receiving and holding end portions of said carpet.

9. The floor support mount according to claim 8 wherein said fastening means comprises an anchor bolt.

10. The floor support mount according to claim 7 comprising a second tube slidably mounted over said first tube and removably secured thereto.

11. The floor support mount according to claim 10 wherein said second tube projects beyond said first tube.

12. The floor support mount according to claim 11 wherein said second tube is slidably adjustable on said first tube.

13. The floor support mount according to claim 7 wherein said first tube is affixed at substantially the center of said base plate.

14. The floor support mount according to claim 7 comprising at least two first tubes mounted on said base plate.

* * * * *